United States Patent
Smith et al.

(10) Patent No.: US 10,131,205 B2
(45) Date of Patent: Nov. 20, 2018

(54) CLIMATE CONTROL SYSTEM

(71) Applicant: Ford Global Technologies, LLC, Dearborn, MI (US)

(72) Inventors: Mark G. Smith, Canton, MI (US); James George Gebbie, Rochester Hills, MI (US); Franco Ragazzi, Ann Arbor, MI (US); Clay Wesley Maranville, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 422 days.

(21) Appl. No.: 14/010,057

(22) Filed: Aug. 26, 2013

(65) Prior Publication Data

US 2015/0052913 A1    Feb. 26, 2015

(51) Int. Cl.
*B60H 1/04* (2006.01)
*B60H 1/00* (2006.01)

(52) U.S. Cl.
CPC ........... *B60H 1/04* (2013.01); *B60H 1/00921* (2013.01); *B60H 2001/00928* (2013.01)

(58) Field of Classification Search
CPC .................. B60H 1/00921; B60H 1/04; B60H 2001/00928
USPC .................................................. 62/79, 238.1
See application file for complete search history.

(56) References Cited

U.S. PATENT DOCUMENTS

| | | | | | |
|---|---|---|---|---|---|
| 4,679,539 A | * | 7/1987 | Storbakken | ............ | F02M 23/14 123/540 |
| 5,265,437 A | * | 11/1993 | Saperstein | ........... | B60H 1/3229 62/243 |
| 5,727,396 A | * | 3/1998 | Boyd | ......... | F24D 3/18 237/2 B |
| 5,784,893 A | * | 7/1998 | Furuhama | .............. | C09K 5/041 62/333 |
| 5,904,052 A | * | 5/1999 | Inoue | ................. | B60H 1/00007 165/43 |
| 6,038,877 A | * | 3/2000 | Peiffer | ............... | B60H 1/00007 62/244 |
| 6,047,770 A | * | 4/2000 | Suzuki | ............... | B60H 1/00007 165/202 |
| 6,070,650 A | * | 6/2000 | Inoue | ................. | B60H 1/00428 165/202 |
| 6,192,695 B1 | | 2/2001 | Hirota | | |

(Continued)

FOREIGN PATENT DOCUMENTS

| | | | | |
|---|---|---|---|---|
| CN | 201506355 U | | 6/2010 | |
| CN | 202734185 U | | 2/2013 | |
| GB | 2386681 A | * | 9/2003 | ......... B60H 1/00885 |

OTHER PUBLICATIONS

State Intellectual Property Office of People's Republic of China, First Office Action for the corresponding Chinese Patent Application No. 201410418949.3 dated Dec. 4, 2017.

*Primary Examiner* — Ljiljana Ciric
*Assistant Examiner* — Kirstin Oswald
(74) *Attorney, Agent, or Firm* — David B. Kelley; Brooks Kushman P.C.

(57) ABSTRACT

A climate control system having a coolant subsystem, a heat pump subsystem, and an intermediate heat exchanger. The intermediate heat exchanger may transfer thermal energy from the heat pump subsystem to the coolant to increase the temperature of the coolant when the climate control system is in a heating mode.

18 Claims, 1 Drawing Sheet

(56) References Cited

U.S. PATENT DOCUMENTS

| | | | |
|---|---|---|---|
| 6,457,324 B2 * | 10/2002 | Zeigler | B60H 1/00007 62/244 |
| 6,474,081 B1 * | 11/2002 | Feuerecker | B60H 1/323 62/434 |
| 6,584,785 B1 * | 7/2003 | Karl | B60H 1/00314 62/117 |
| 6,722,147 B2 * | 4/2004 | Heyl | B60H 1/00907 62/244 |
| 7,669,647 B2 * | 3/2010 | Tsubone | B60H 1/00492 123/142.5 R |
| 8,517,087 B2 * | 8/2013 | Zeigler | B60H 1/00907 165/202 |
| 2001/0020529 A1 | 9/2001 | Karl | B60H 1/00007 165/202 |
| 2001/0052238 A1 * | 12/2001 | Burk | B60H 1/00921 62/323.1 |
| 2002/0043413 A1 | 4/2002 | Kimishima et al. | |
| 2003/0010488 A1 * | 1/2003 | Watanabe | B60H 1/00335 165/202 |
| 2003/0167925 A1 * | 9/2003 | Aikawa | B60H 1/00492 96/126 |
| 2003/0182961 A1 * | 10/2003 | Nishida | B60H 1/00921 62/324.1 |
| 2004/0139757 A1 * | 7/2004 | Kuehl | B60H 1/00592 62/237 |
| 2004/0187506 A1 | 9/2004 | Iwanami et al. | |
| 2005/0034473 A1 * | 2/2005 | Casar | B60H 1/00899 62/324.1 |
| 2005/0039878 A1 * | 2/2005 | Meyer | B60H 1/00878 165/42 |
| 2005/0067158 A1 * | 3/2005 | Ito | B60H 1/00007 165/204 |
| 2005/0126218 A1 | 6/2005 | Sohn | |
| 2005/0178523 A1 * | 8/2005 | Itoh | B60H 1/00385 165/42 |
| 2005/0217288 A1 * | 10/2005 | Uno | B60H 1/32 62/157 |
| 2006/0137853 A1 * | 6/2006 | Haller | B60H 1/005 165/42 |
| 2008/0041071 A1 * | 2/2008 | Itoh | B60H 1/00342 62/79 |
| 2008/0202722 A1 | 8/2008 | Feuerecker et al. | |
| 2009/0130513 A1 | 5/2009 | Tsuchiya et al. | |
| 2009/0139686 A1 * | 6/2009 | Suzuki | B60K 6/445 165/42 |
| 2009/0205353 A1 * | 8/2009 | Takahashi | B60H 1/00899 62/324.1 |
| 2009/0249807 A1 | 10/2009 | Nemesh et al. | |
| 2010/0077777 A1 | 4/2010 | Lifson et al. | |
| 2010/0281901 A1 | 11/2010 | Kawase et al. | |
| 2010/0326127 A1 * | 12/2010 | Oomura | B60H 1/00785 62/498 |
| 2011/0109157 A1 | 5/2011 | Tani | |
| 2011/0113800 A1 | 5/2011 | Sekiya et al. | |
| 2011/0174000 A1 | 7/2011 | Richter et al. | |
| 2012/0174602 A1 * | 7/2012 | Olivier | B60H 1/004 62/79 |
| 2012/0179329 A1 | 7/2012 | Okamoto et al. | |
| 2012/0205088 A1 * | 8/2012 | Morisita | B60H 1/00921 165/202 |
| 2012/0222441 A1 * | 9/2012 | Sawada | B60H 1/00392 62/238.1 |
| 2012/0297805 A1 * | 11/2012 | Kamada | B60H 1/00278 62/208 |
| 2012/0304674 A1 * | 12/2012 | Schwarzkopf | B60H 1/00385 62/79 |
| 2013/0019615 A1 | 1/2013 | Choi et al. | |
| 2013/0139528 A1 | 6/2013 | Katayama et al. | |
| 2013/0145790 A1 * | 6/2013 | Schafer | B60H 1/00899 62/333 |
| 2013/0219939 A1 | 8/2013 | Eisenhour | |
| 2015/0183296 A1 | 7/2015 | Ragazzi | |
| 2015/0210141 A1 | 7/2015 | Ragazzi | |

\* cited by examiner

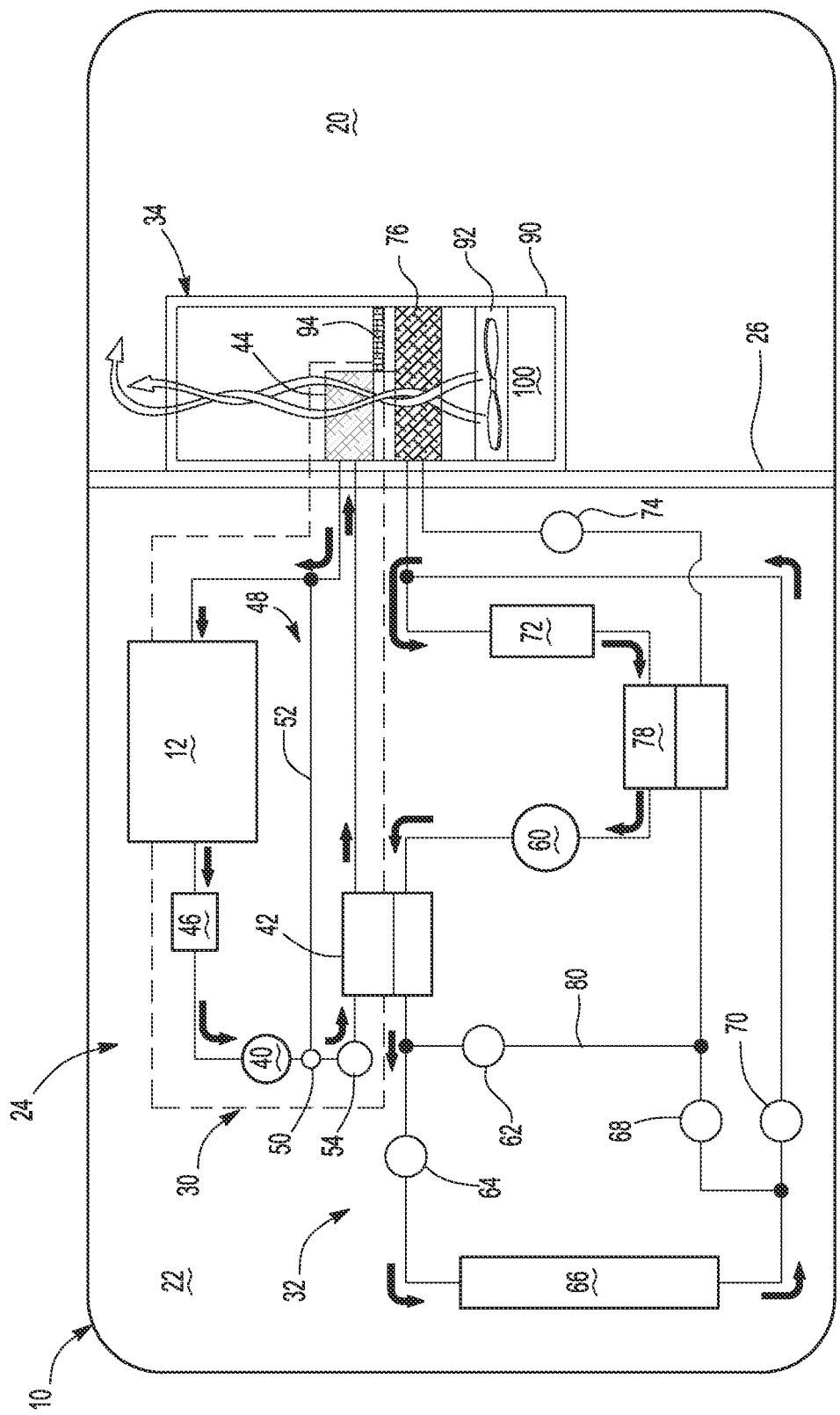

CLIMATE CONTROL SYSTEM

TECHNICAL FIELD

This application relates to a climate control system for a vehicle.

BACKGROUND

A waste heat controller for controlling waste heat from an engine is disclosed in U.S. Patent Publication No. 2011/0109157.

SUMMARY

In at least one embodiment, a climate control system is provided. The climate control system may include a coolant subsystem, a heat pump subsystem, and an intermediate heat exchanger. The coolant subsystem may circulate coolant to a heater core that may be disposed in a passenger compartment of a vehicle. The heat pump subsystem may circulate a refrigerant. The intermediate heat exchanger may transfer thermal energy from the refrigerant to the coolant to increase the temperature of the coolant when the climate control system is in a heating mode.

In at least one embodiment, a method of controlling a climate control system is provided. The method may include circulating coolant in a coolant subsystem to provide heat to a heater core that may be disposed in a passenger compartment of a vehicle. A refrigerant may be circulated by a heat pump subsystem such that high temperature and high pressure refrigerant is circulated through an intermediate heat exchanger to transfer thermal energy from the refrigerant to the coolant.

BRIEF DESCRIPTION OF THE DRAWINGS

FIG. 1 is a schematic representation of a vehicle having a climate control system.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Referring to FIG. 1, a schematic representation of a vehicle 10 is shown. The vehicle 10 may be a motor vehicle, such as a car or truck.

The vehicle 10 may have any suitable drivetrain and may include one or more power sources 12 that may be used to propel the vehicle 10 and/or power vehicle components. In FIG. 1, the vehicle 10 is shown with a single power source 12 that may be configured as an internal combustion engine that may be adapted to combust any suitable type of fuel, such as gasoline, diesel fuel, or hydrogen. As another option, vehicle 10 may be configured as a hybrid vehicle that may have a plurality of power sources, such as a non-electrical power source like an engine and an electrical power source.

The vehicle 10 may include a passenger compartment 20, an engine compartment 22, and a climate control system 24.

The passenger compartment 20 may be disposed inside the vehicle 10 and may receive one or more occupants. A portion of the climate control system 24 may be disposed in the passenger compartment 20.

The engine compartment 22 may be disposed proximate the passenger compartment 20. One or more power sources 12 as well as a portion of the climate control system 24 may be disposed in the engine compartment 22. The engine compartment 22 may be separated from the passenger compartment 20 by a bulkhead 26.

The climate control system 24 may circulate air and/or control or modify the temperature of air that is circulated in the passenger compartment 20. The climate control system 24 may include a coolant subsystem 30, a heat pump subsystem 32, and a ventilation subsystem 34.

The coolant subsystem 30, which may also be referred to as a coolant loop, may circulate a fluid, such as coolant, to cool the power source 12. For example, waste heat that is generated by the power source 12 when the power source is running or operational may be transferred to the coolant and then circulated to one or more heat exchangers to transfer thermal energy from the coolant. In at least one embodiment, the coolant subsystem 30 may include a coolant pump 40, an intermediate heat exchanger 42, a heater core 44, an optional coolant heater 46, and a bypass loop 48 that may be fluidly interconnected by conduits such as tubes, hoses, pipes, or the like. The coolant subsystem 30 may also include a radiator (not shown) that may be disposed in the engine compartment 22 for transferring thermal energy to the ambient air surrounding the vehicle 10.

The coolant pump 40 may circulate coolant through the coolant subsystem 30. The coolant pump 40 may be powered by an electrical or non-electrical power source. For example, the coolant pump 40 may be operatively coupled to a power source 12 configured as an internal combustion engine via a belt or may be driven by an electrically powered motor. The coolant pump 40 may receive coolant from the power source 12 and circulate the coolant in a closed loop. For instance, when the climate control system 24 is in a heating mode, coolant may be routed from the coolant pump 40 to the intermediate heat exchanger 42 and then to the heater core 44 before returning to the power source 12 as represented by the arrowed lines.

The intermediate heat exchanger 42 may facilitate the transfer of thermal energy between the coolant subsystem 30 and the heat pump subsystem 32. The intermediate heat exchanger 42 may be part of the coolant subsystem 30 and the heat pump subsystem 32. The intermediate heat exchanger 42 may have any suitable configuration. For instance, the intermediate heat exchanger 42 may have a plate-fin, tube-fin, or tube-and-shell configuration that may facilitate the transfer of thermal energy without mixing the heat transfer fluids in the coolant subsystem 30 and heat pump subsystems 32. Heat may be transferred from the heat pump subsystem 32 to the coolant via the intermediate heat exchanger 42 when the climate control system 24 is in a heating mode as will be discussed in more detail below.

The heater core 44 may transfer thermal energy from the coolant to air in the passenger compartment 20. The heater core 44 may be disposed in the passenger compartment 20 in the ventilation subsystem 34 and may have any suitable configuration. For example, the heater core 44 may have a plate-fin or tube-fin construction in one or more embodiments.

The coolant subsystem 30 may optionally include a coolant heater 46 that heat the coolant. In at least one embodiment, the coolant heater 46 may be an electrical coolant heater, such as a high voltage coolant heater or low voltage coolant heater that may be disposed upstream of the heater core 44 and that may use electrical energy to heat the coolant. An electrical coolant heater may receive power from an electrical power source on the vehicle 10 and/or an electrical power source remote from the vehicle 10, such as via an electrical outlet. Alternatively or in addition, the coolant heater 46 may be a non-electrical coolant heater, such as a fuel-operated or fuel powered heater.

The bypass loop 48 may route coolant such that the coolant is not heated by the power source 12 or engine. A bypass loop control valve 50 may control the flow of coolant through the bypass loop 48. More specifically, the bypass loop control valve 50 may permit coolant to flow through a bypass line 52 and inhibit the flow of coolant from the power source 12 to the intermediate heat exchanger 42 when in a first position. In such a position, a second coolant pump 54 may circulate coolant through the bypass loop 48 from the intermediate heat exchanger 42 to the heater core 44 to the bypass line 52 and back to the second coolant pump 54. As such, the coolant in the coolant subsystem 30 may be heated independently by the heat pump subsystem 32 via the intermediate heat exchanger 42 in some operation modes. The bypass loop control valve 50 may also inhibit the flow of coolant through the bypass line 52 when in a second position. The second coolant pump 54 may or may not circulate coolant when coolant does not flow through the bypass line 52.

The heat pump subsystem 32 may transfer thermal energy to or from the passenger compartment 20 and to or from the coolant subsystem 30. In at least one embodiment, the heat pump subsystem 32 may be configured as a vapor compression heat pump subsystem in which a fluid is circulated through the heat pump subsystem 32 to transfer thermal energy to or from the passenger compartment 20. The heat pump subsystem 32 may operate in various modes, including, but not limited to a cooling mode and a heating mode. In the cooling mode, the heat pump subsystem 32 may circulate a heat transfer fluid, which may be called a refrigerant, to transfer thermal energy from inside the passenger compartment 20 to outside the passenger compartment 20. In a heating mode, the heat pump subsystem 32 may transfer thermal energy from the refrigerant to the coolant via the intermediate heat exchanger 42 without circulating the refrigerant through a heat exchanger in the passenger compartment 20 as will be discussed in more detail below. For brevity, an abbreviated discussion of the heat pump subsystem 32 is provided below that focuses on a vapor compression cycle that may be employed in the heating mode. In such a configuration, the heat pump subsystem 32 may include a pump 60, a first control valve 62, a first expansion device 64, an exterior heat exchanger 66, a second control valve 68, a third control valve 70, an accumulator 72, a second expansion device 74, an interior heat exchanger 76, and an optional internal heat exchanger 78. Components of the heat pump subsystem 32 may be fluidly connected in a closed loop via one or more conduits, such as a tube, hose or the like. In FIG. 1, the refrigerant circulation path when in the heating mode is represented by the arrowed lines.

The pump 60, which may also be called a compressor, may pressurize and circulate the refrigerant through the heat pump subsystem 32. The pump 60 may be powered by an electrical or non-electrical power source. For example, the pump 60 may be operatively coupled to a power source 12 configured as an internal combustion engine via a belt or may be driven by an electrically powered motor. In a heating mode, the pump 60 may provide high pressure refrigerant to the intermediate heat exchanger 42, which in turn may transfer heat from the high pressure refrigerant to coolant passing through the intermediate heat exchanger 42 to heat the coolant.

The first control valve 62 may be disposed along a bypass path 80 that may be disposed between the intermediate heat exchanger 42 and the first expansion device 64. The bypass path 80 may permit some refrigerant to bypass the first expansion device 64 and the exterior heat exchanger 66 and flow to the internal heat exchanger 78 (if provided), the second expansion device 74, and the interior heat exchanger 76 when the first control valve 62 is open. The first control valve 62 may be closed to inhibit the flow of refrigerant through the bypass path 80 to the interior heat exchanger 76 when in heating mode.

The first expansion device 64 may be disposed between and may be fluidly connected to the intermediate heat exchanger 42 and the exterior heat exchanger 66. The first expansion device 64 may be provided to change the pressure of the refrigerant. For instance, the first expansion device 64 may be a thermal expansion valve (TXV) or a fixed or variable position valve that may or may not be externally controlled. The first expansion device 64 may reduce the pressure of the refrigerant that passes through the first expansion device 64 from the intermediate heat exchanger 42 to the exterior heat exchanger 66. As such, high pressure refrigerant received from the intermediate heat exchanger 42 may exit the first expansion device 64 at a lower pressure and as a liquid and vapor mixture in the heating mode.

The exterior heat exchanger 66 may be disposed outside the passenger compartment 20. In a cooling mode or air conditioning context, the exterior heat exchanger 66 may function as a condenser and may transfer heat to the surrounding environment to condense the refrigerant from a vapor to liquid. In a heating mode, the exterior heat exchanger 66 may function as an evaporator and may transfer heat from the surrounding environment to the refrigerant, thereby causing the refrigerant to vaporize.

The second control valve 68 may be disposed between the exterior heat exchanger 66 and the bypass path 80. The second control valve 68 may be configured as a check valve and may inhibit the flow of refrigerant from the bypass path 80 to the exterior heat exchanger 66. As such, refrigerant exiting the exterior heat exchanger 66 when the climate control system 24 is in the heating mode may be routed to the third control valve 70.

A third control valve 70 may be disposed between the exterior heat exchanger 66 and the accumulator 72. The third control valve 70 may help control the flow of refrigerant that exits the exterior heat exchanger 66. In the heating mode, the third control valve 70 may be open to permit refrigerant to flow from the exterior heat exchanger 66 to the accumulator 72. The third control valve 70 may be closed and the second expansion device 74 may be opened in other modes, such as a cooling mode.

The accumulator 72 may act as a reservoir for storing any residual liquid refrigerant so that vapor refrigerant rather than liquid refrigerant may be provided to the pump 60. The accumulator 72 may include a desiccant that absorbs small amounts of water moisture from the refrigerant.

The second expansion device 74 may be disposed between and may be fluidly connected to the exterior heat exchanger 66 and the interior heat exchanger 76. The second expansion device 74 may have a similar configuration as the first expansion device 64 and may be provided to change the pressure of the refrigerant similar to the first expansion device 64. In addition, the second expansion device 74 may be closed to inhibit the flow of refrigerant. More specifically, the second expansion device 74 may be closed to inhibit the flow of refrigerant from the exterior heat exchanger 66 to the interior heat exchanger 76 in the heating mode. As such, closing the second expansion device 74 may inhibit the flow of refrigerant through the second control valve 68 to the internal heat exchanger 78 (if provided), as well as through the interior heat exchanger 76.

The interior heat exchanger 76 may be fluidly connected to the second expansion device 74. The interior heat exchanger 76 may be disposed inside the passenger compartment 20. In a cooling mode or air conditioning context, the interior heat exchanger 76 may function as an evaporator and may receive heat from air in the passenger compartment 20 to vaporize the refrigerant. Refrigerant exiting the interior heat exchanger 76 may be routed to the accumulator 72. In the heating mode, refrigerant may not be routed to the interior heat exchanger 76 due to the closure of the second expansion device 74.

The internal heat exchanger 78, if provided, may transfer thermal energy between refrigerant flowing through different regions of the heat pump subsystem 32. The internal heat exchanger 78 may be disposed outside the passenger compartment 20. In a cooling mode or air conditioning context, heat may be transferred from refrigerant that is routed from the exterior heat exchanger 66 to the interior heat exchanger 76 to refrigerant that is routed from the accumulator 72 to the pump 60. In the heating mode, the internal heat exchanger 78 does not transfer thermal energy between such refrigerant flow paths since the second expansion device 74 is closed, thereby inhibiting the flow of refrigerant through a portion of the internal heat exchanger 78.

The ventilation subsystem 34 may circulate air in the passenger compartment 20 of the vehicle 10. The ventilation subsystem 34 may have a housing 90, a blower 92, and a temperature door 94.

The housing 90 may receive components of the ventilation subsystem 34. In FIG. 1, the housing 90 is illustrated such that internal components are visible rather than hidden for clarity. In addition, airflow through the housing 90 and internal components is represented by the arrowed line. The housing 90 may be at least partially disposed in the passenger compartment 20. For example, the housing 90 or a portion thereof may be disposed under an instrument panel of the vehicle 10. The housing 90 may have an air intake portion 100 that may receive air from outside the vehicle 10 and/or air from inside the passenger compartment 20. For example, the air intake portion 100 may receive ambient air from outside the vehicle 10 via an intake passage, duct, or opening that may be located in any suitable location, such as proximate a cowl, wheel well, or other vehicle body panel. The air intake portion 100 may also receive air from inside the passenger compartment 20 and recirculate such air through the ventilation subsystem 34. One or more doors or louvers may be provided to permit or inhibit air recirculation.

The blower 92 may be disposed in the housing 90. The blower 92, which may also be called a blower fan, may be disposed near the air intake portion 100 and may be configured as a centrifugal fan that may circulate air through the ventilation subsystem 34.

The temperature door 94 may be disposed between the interior heat exchanger 76 and the heater core 44. In the embodiment shown, the temperature door 94 is disposed downstream of the interior heat exchanger 76 and upstream of the heater core 44. The temperature door 94 may block or permit airflow through the heater core 44 to help control the temperature of air in the passenger compartment 20. For instance, the temperature door 94 may permit airflow through the heater core 44 in the heating mode such that heat may be transferred from the coolant to air passing through the heater core 44. This heated air may then be provided to a plenum for distribution to ducts and vents or outlets located in the passenger compartment 20. The temperature door 94 may move between a plurality of positions to provide air having a desired temperature. In FIG. 1, the temperature door 94 is shown in a full heat position in which airflow is directed through the heater core 44.

Optionally, a supplemental heater or supplemental heat source (not shown) may be provided with the ventilation subsystem 34. For example, an electric or electrically powered heater like a resistance wire heater, a positive temperature coefficient (PTC) heater, or a thermoelectric device.

The climate control system described above may help decrease the energy cost of heat provided by supplementing heat provided by an engine or vehicle power source. More specifically, the heat pump subsystem may generate and provide additional heat to coolant that may be used to heat the passenger compartment of a vehicle. Moreover, the climate control system may facilitate the commonization of climate control system components, such as heater core and/or ventilation system designs. As such, common heater core and/or ventilation systems may be provided with vehicles having different powertrain configurations, such as models having internal combustion engine and hybrid electric drivetrain options. Such commonization may allow associated tooling and manufacturing costs to be significantly reduced by providing common component designs across vehicle models that are offered with multiple powertrain configurations, and/or between vehicle platforms.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A climate control system comprising:
   a coolant subsystem for circulating coolant;
   a heat pump subsystem for circulating refrigerant;
   an intermediate heat exchanger for transferring thermal energy from the refrigerant to increase coolant temperature, the intermediate heat exchanger being fluidly connected to the coolant subsystem and the heat pump subsystem;
   an engine;
   a coolant heater;
   a first coolant pump disposed outside the engine;
   a second coolant pump;
   a bypass loop control valve disposed between the first and second coolant pumps; and
   a heater core;
   wherein coolant can circulate sequentially from the engine through the coolant heater, the first coolant pump, the bypass loop control valve, the second coolant pump, the intermediate heat exchanger, and the heater core when the climate control system is in a heating mode.

2. The system of claim 1 wherein the engine heats the coolant.

3. The system of claim 2 wherein the coolant heater for heating the coolant is disposed outside the engine.

4. The system of claim 2 wherein the first coolant pump circulates the coolant when the engine is on.

5. The system of claim 1 wherein the heat pump subsystem is a vapor compression heat pump subsystem.

6. The system of claim 1 wherein the intermediate heat exchanger is disposed outside a passenger compartment.

7. The system of claim 1 wherein the heat pump subsystem circulates high pressure refrigerant through the intermediate heat exchanger to transfer heat from the refrigerant to the coolant.

8. The system of claim 1 wherein the heat pump subsystem includes an exterior heat exchanger and an interior heat exchanger, wherein the heat pump subsystem circulates refrigerant through the exterior heat exchanger and the intermediate heat exchanger but not the interior heat exchanger in the heating mode.

9. The system of claim 8 wherein the heat pump subsystem further comprises a compressor that compresses vapor refrigerant, wherein the intermediate heat exchanger is disposed between the compressor and the exterior heat exchanger.

10. The system of claim 9 further comprising a first expansion device fluidly connected between the intermediate heat exchanger and the exterior heat exchanger for decreasing refrigerant pressure in the heating mode.

11. The system of claim 9 further comprising an accumulator fluidly connected between the exterior heat exchanger and the compressor.

12. The system of claim 11 further comprising a second expansion device that is disposed between the exterior heat exchanger and the interior heat exchanger, wherein the second expansion device is closed to inhibit refrigerant from circulating through the interior heat exchanger in the heating mode.

13. The system of claim 12 further comprising a first control valve disposed along a bypass path that permits some refrigerant to bypass the exterior heat exchanger and flow to the interior heat exchanger via the second expansion device, wherein the first control valve is closed when in heating mode.

14. The system of claim 13 further comprising a second control valve disposed between the exterior heat exchanger and the bypass path, wherein refrigerant does not flow through the second control valve from the exterior heat exchanger to the bypass path in the heating mode.

15. The system of claim 14 further comprising a third control valve disposed between the exterior heat exchanger and the accumulator, wherein the third control valve is open to permit refrigerant to circulate from the exterior heat exchanger to the accumulator in the heating mode.

16. A method for controlling a system, comprising:
circulating coolant in a coolant subsystem from an engine sequentially through a coolant heater, a first coolant pump outside the engine, an intermediate heat exchanger, a heater core, and directly back to the engine to heat the heater core; and
circulating refrigerant through the intermediate heat exchanger and operating a second coolant pump to circulate coolant through a bypass loop so coolant is not heated by the engine.

17. The method of claim 16 wherein the intermediate heat exchanger is disposed between a compressor and an exterior heat exchanger and is disposed outside a passenger compartment of a vehicle.

18. A method of controlling a climate control system, comprising:
circulating coolant in a coolant subsystem from an engine sequentially through a coolant heater, first and second coolant pumps disposed outside the engine, an intermediate heat exchanger, a heater core, and directly back to the engine to heat the heater core in a passenger compartment of a vehicle; and
circulating a refrigerant through the intermediate heat exchanger to transfer thermal energy from the refrigerant to the coolant,
wherein circulating coolant in the coolant subsystem includes providing the second coolant pump to circulate coolant through a bypass loop such that coolant is not heated by the engine and such that coolant is then circulated to the intermediate heat exchanger and the heater core, and not circulating the refrigerant through an interior heat exchanger of a heat pump subsystem that is disposed in the passenger compartment when heating the coolant so that the coolant subsystem does not transfer thermal energy from the passenger compartment.

* * * * *